United States Patent
Holmes et al.

(10) Patent No.: US 11,032,235 B2
(45) Date of Patent: Jun. 8, 2021

(54) SYSTEM AND METHOD FOR MULTI-AGENT COORDINATION

(71) Applicant: Dell Products L.P., Hopkinton, MA (US)

(72) Inventors: Bruce Anthony Holmes, Round Rock, TX (US); Vadim Ivanov, Austin, TX (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 16/393,907

(22) Filed: Apr. 24, 2019

(65) Prior Publication Data

US 2020/0344197 A1 Oct. 29, 2020

(51) Int. Cl.
*H04L 12/18* (2006.01)
*H04L 29/12* (2006.01)

(52) U.S. Cl.
CPC ............ *H04L 61/103* (2013.01); *H04L 12/18* (2013.01); *H04L 61/1552* (2013.01)

(58) Field of Classification Search
CPC ....... H04L 47/32; H04L 49/60; H04L 61/103; H04L 61/2007; H04L 61/6004; H04L 61/6009; H04L 63/0236; H04L 12/18; H04L 12/4641; H04L 61/10; H04L 61/1552; H04B 7/2606; H04W 36/0016
USPC ... 370/255, 389, 392, 315, 248, 252, 395.54
See application file for complete search history.

(56) References Cited

U.S. PATENT DOCUMENTS

| | | | |
|---|---|---|---|
| 2010/0027459 A1* | 2/2010 | Ikeda | H04W 36/0016 370/315 |
| 2015/0372968 A1* | 12/2015 | Tonzetic | H04L 61/2007 709/245 |
| 2018/0034722 A1* | 2/2018 | Gupta | H04L 12/4641 |

* cited by examiner

*Primary Examiner* — Harun Chowdhury
(74) *Attorney, Agent, or Firm* — Chamberlain, Hrdlicka, White, Williams & Aughtry

(57) ABSTRACT

A host includes persistent storage and a communication manager. The persistent storage stores an address conversion table. The communication manager obtains a multi-agent initiation request from an application. The communication manager also generates a network communication based on the multi-agent initiation request using the address conversion table. The communication manager also transmits the network communication to at least two other hosts.

20 Claims, 13 Drawing Sheets

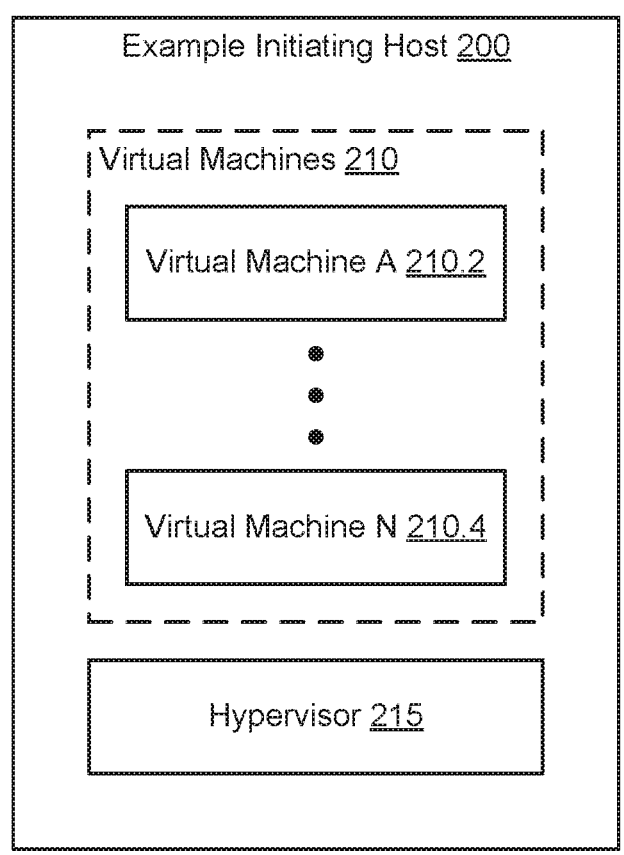
FIG. 2.1

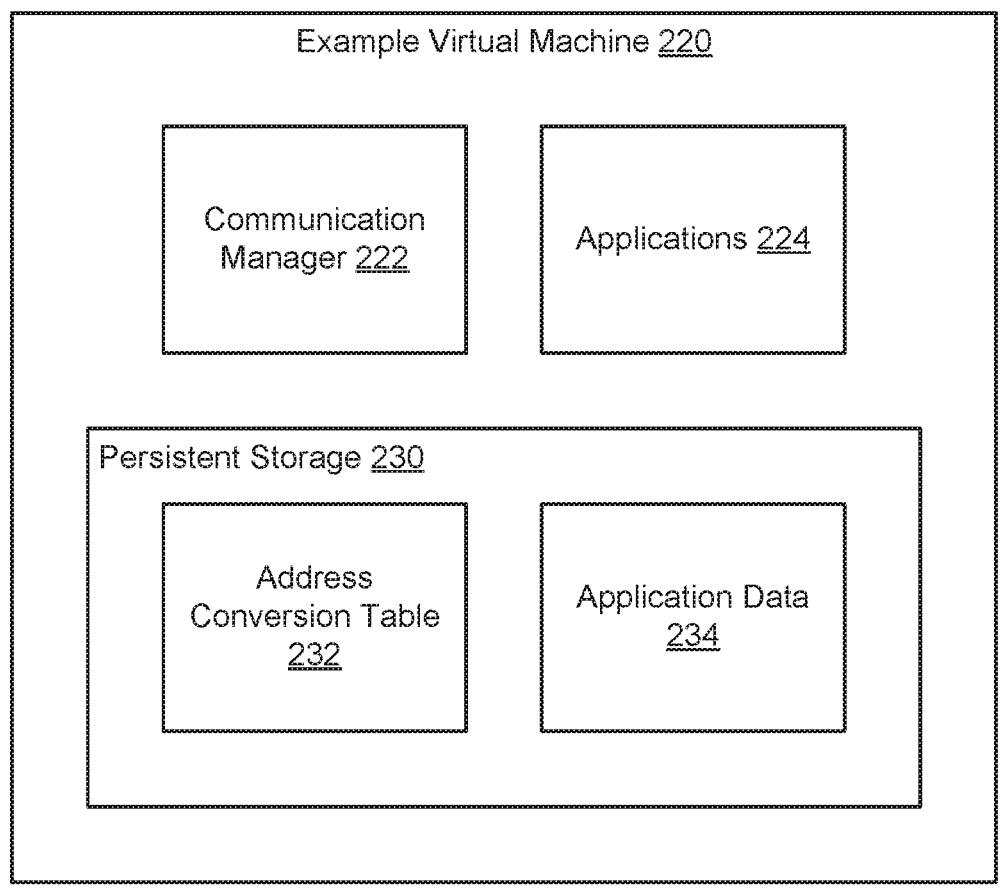
FIG. 2.2

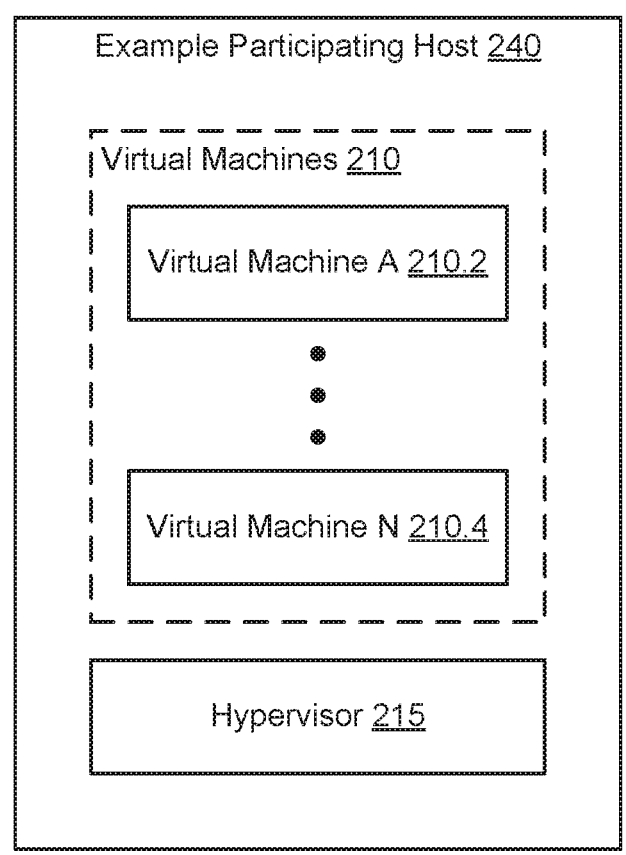
FIG. 2.3

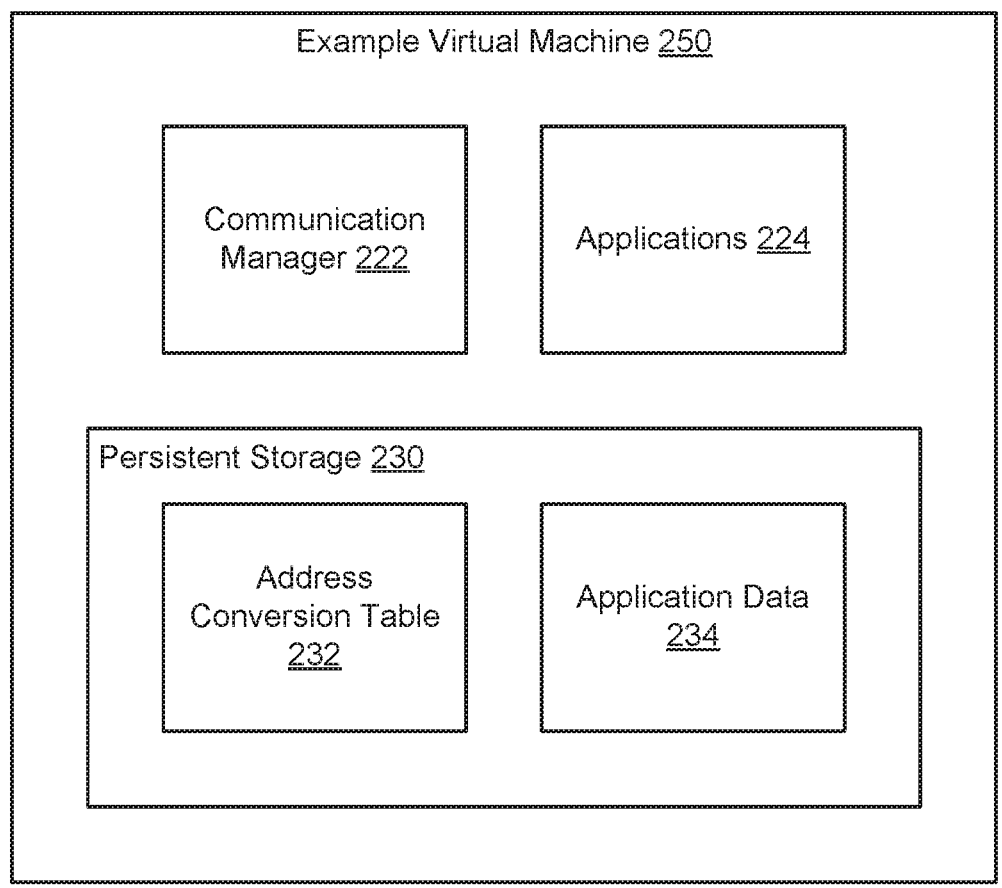
FIG. 2.4

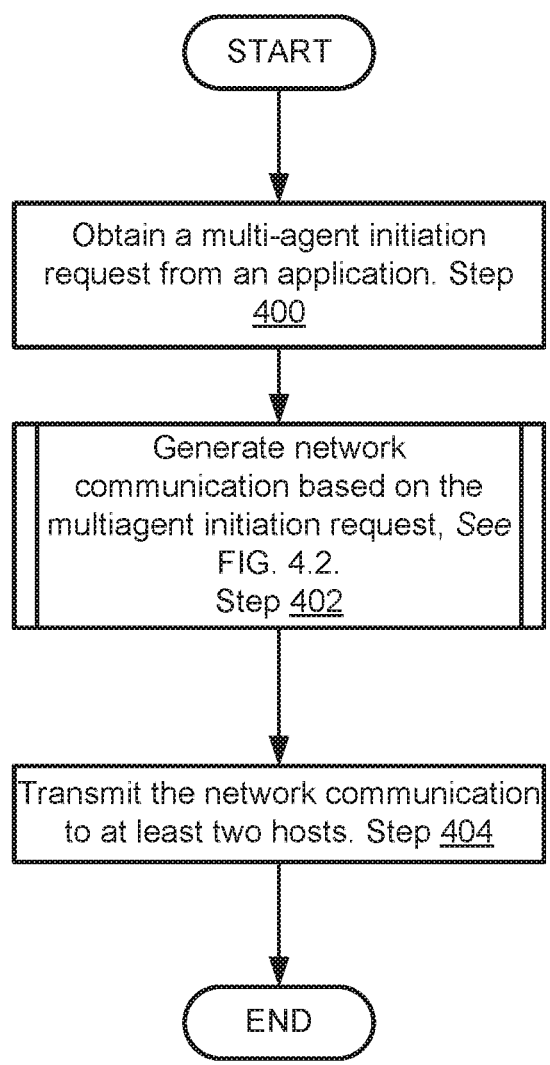
FIG. 4.1

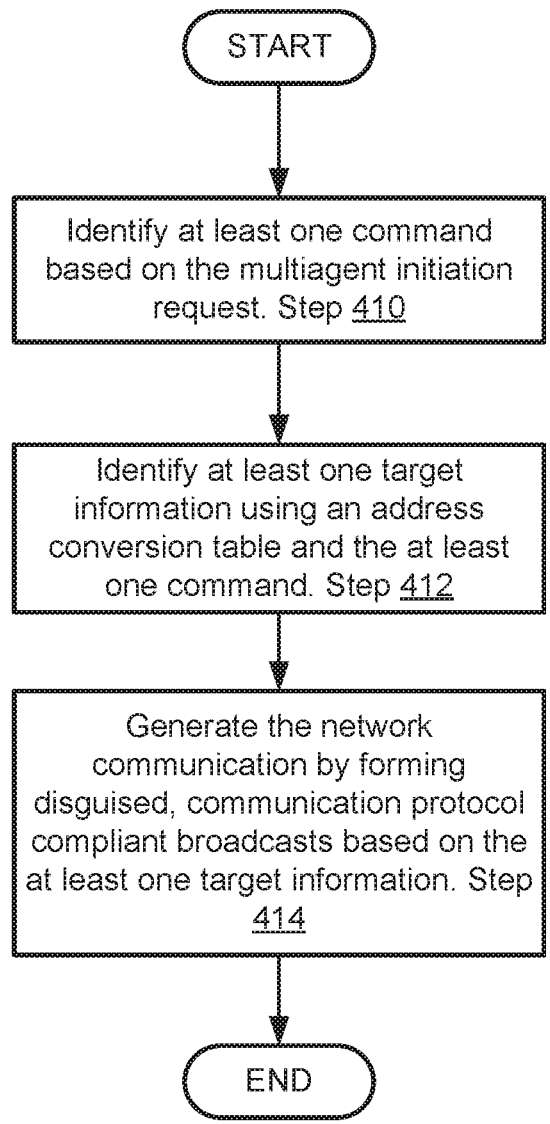
FIG. 4.2

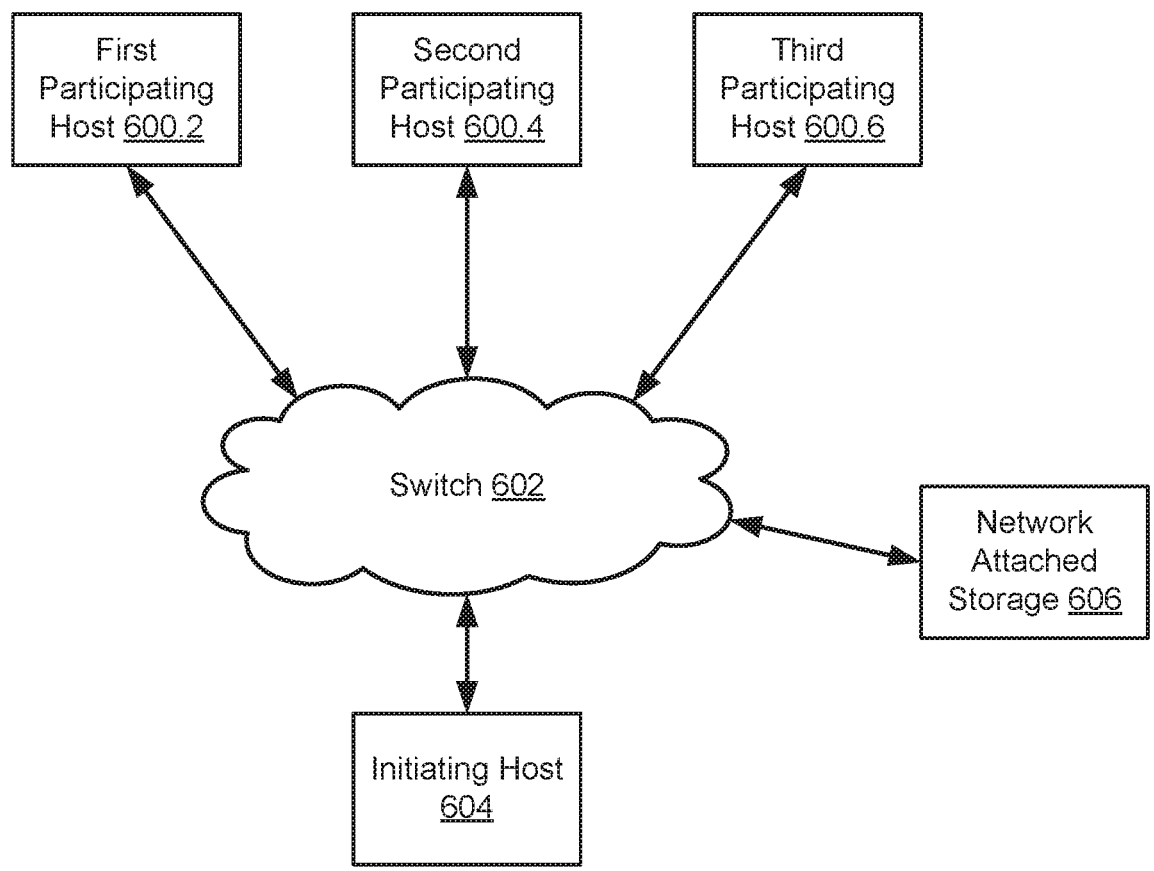
FIG. 6.1

| Entry | Target Information | Command |
|---|---|---|
| 1 | 254.254.1.201 | Hello |
| 2 | 254.254.1.202 | Shutdown |
| 3 | 254.254.1.203 | Report |
| 4 | 254.254.1.204 | Initiate Stress Test |

FIG. 6.2

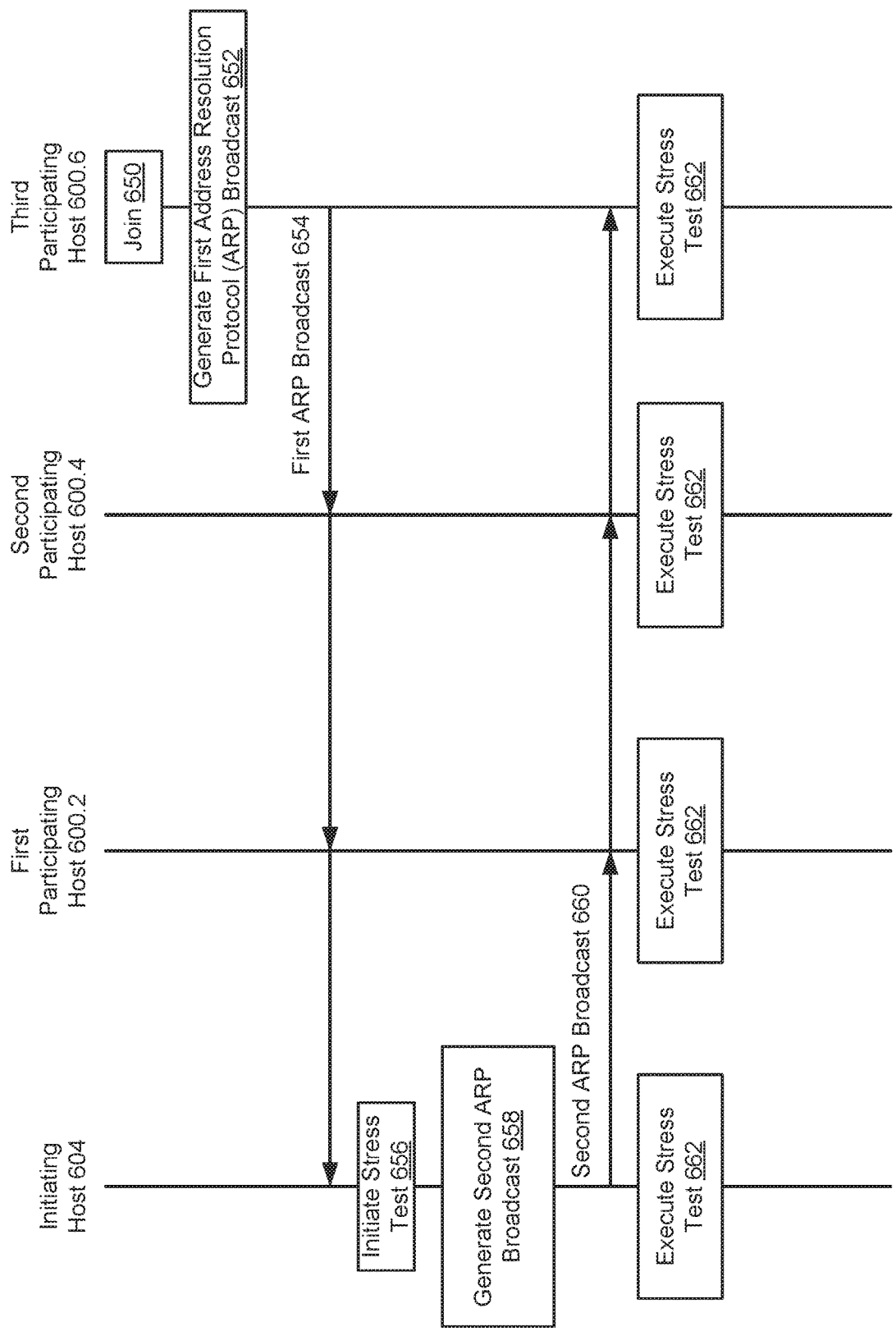
FIG. 6.3

SYSTEM AND METHOD FOR MULTI-AGENT COORDINATION

BACKGROUND

Computing devices may interact via a network. For example, data may be sent between computing devices via the network. In some cases, multiple computing devices may cooperatively perform a task. When perform such a task, each of the multiple computing devices may be independent from each other.

SUMMARY

In one aspect, a host in accordance with one or more embodiments of the invention includes persistent storage and a communication manager. The persistent storage stores an address conversion table. The communication manager obtains a multi-agent initiation request from an application; generates a network communication based on the multi-agent initiation request using the address conversion table; and transmits the network communication to at least two other hosts.

In one aspect, a method for initiating a command across multiple hosts in accordance with one or more embodiments of the invention includes obtaining, by a host of the multiple hosts, a multi-agent initiation request from an application; generating, by the host of the multiple hosts, a network communication based on the multi-agent initiation request using an address conversion table; and transmitting the network communication to at least two other hosts of the multiple hosts.

In one aspect, a non-transitory computer readable medium in accordance with one or more embodiments of the invention includes computer readable program code, which when executed by a computer processor enables the computer processor to perform a method for initiating a command across multiple hosts. The method includes obtaining, by a host of the multiple hosts, a multi-agent initiation request from an application; generating, by the host of the multiple hosts, a network communication based on the multi-agent initiation request using an address conversion table; and transmitting the network communication to at least two other hosts of the multiple hosts.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example initiating host in accordance with one or more embodiments of the invention.

FIG. 2.2 shows a diagram of an example virtual machine hosted by an example initiating host in accordance with one or more embodiments of the invention.

FIG. 2.3 shows a diagram of an example participating host in accordance with one or more embodiments of the invention.

FIG. 2.4 shows a diagram of an example virtual machine hosted by an example participating host in accordance with one or more embodiments of the invention.

FIG. 4.1 shows a flowchart of a method of coordinating system-level functionality in accordance with one or more embodiments of the invention.

FIG. 4.2 shows a flowchart of a method of generating a network communication in accordance with one or more embodiments of the invention.

FIG. 6.1 shows a diagram of an example system.

FIG. 6.2 shows a diagram of an address conversion table utilized by the example system of FIG. 6.1.

FIG. 6.3 shows an interaction diagram of actions performed by the example system of FIG. 6.1.

DETAILED DESCRIPTION

Figure 1:
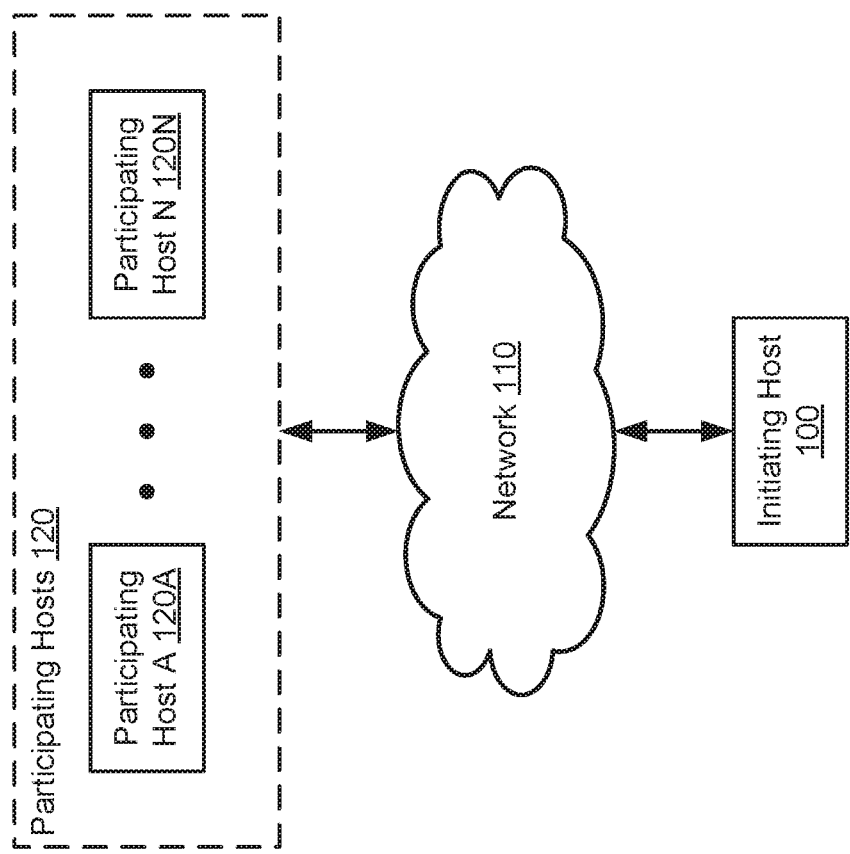
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for coordinating system-level functionality in a distributed system. The distributed system in accordance with one or more embodiments of the invention include any number of participating hosts that cooperatively provide system-level functionality.

To coordinate the individual functionality of the participating hosts, an ultra-low overhead scheme for coordination between the participating hosts may be implemented by an initiating host and any number of participating hosts. To provide such functionality, embodiments of the invention may repurpose existing network communications supported by a network that interconnects the initiating host and any number participating hosts.

In one or more embodiments of the invention, the initiating host and/or the participating hosts may include an address conversion table. The address conversion table may be utilized to determine commands to be performed when repurposed broadcast communications are received by the participating hosts. The participating hosts may perform the commands implicated by the received broadcast communications. By doing so, transmission of a single broadcast communication may provide for coordination between any number of participating hosts. Such functionality may provide for coordination in a distributed system while consuming fewer computing resources than contemporary methods of coordination.

In one or more embodiments of the invention, the address conversion table may be used in conjunction with repurposed broadcast to form an effective application programming interface. In other words, predetermined functionality of one or more portions of a distributed system may be invoked by sending a repurposed broadcast communication that includes information included in the address conversion table. Upon receipt of such broadcasts, the components of the distributed system may identify a command specified in copies of the address conversion table utilized by each of the components. Once identified, the components of the distributed system may perform the identified command.

FIG. 1 shows an example system in accordance with one or more embodiments of the invention. The example system may include an initiating host (100). An initiating host (100) may be an entity that initiates a multi-agent process. For example, the initiating host (100) may cause any number of participating hosts (120) to begin to cooperatively perform one or more predetermined processes. To do so, the initiating host (100) may broadcast a message that is compatible with a communication scheme employed by a network (110) interconnecting the initiating host (100) and the participating hosts (120).

In response to receiving the broadcast message, the participating hosts (120) may each perform predetermined functionality corresponding to the broadcast message. For example, the participating hosts (120) may simultaneously perform similar or different predetermined functionality that gives rise to system-level functionality. In other words, system-level functionality that a single participating host (e.g., 120A, 102N), individually, is unable to provide on its own.

In one or more embodiments of the invention, the initiating host (100) utilizes an ultra-low overhead method for initiating the multi-entity process. The ultra-low overhead method for initiating the multi-entity process may repurpose an existing communication scheme compliant broadcast for uses other than that originally intended by the communication scheme. The ultra-low overhead method may not include communications between the initiating host (100) and the participating hosts (120), prior to transmission of the single broadcast message, for organizational purposes between the initiating host (100) and the participating hosts (120).

In one or more embodiments of the invention, the communication scheme compliant broadcast is part of a network discovery protocol employed by the network (110). The network discovery protocol may be, for example, an Address Resolution Protocol (ARP). Other network discovery protocol may be utilized without departing from the invention.

In a scenario in which ARP is the communication scheme, the communication scheme compliant broadcast may be an ARP request. For example, to send a communication scheme compliant broadcast, the initiating host (100) may utilize a ping utility of an operating system or other network administration utility of the initiating host (100) by requesting that the reachability of a target be determined. However, the target may be intentionally selected so that it cannot exist on any portion of the network (110). Consequently, the ping utility may generate Internet Control Message Protocol (ICMP) echo request packets addressed to the target. Such packets may be broadcast of the network (110) in accordance with the ARP. Because no entity receiving the broadcast is the target, no entity may reply to the broadcast.

However, the participating hosts (120) may be programmed to, upon receipt of the broadcast addressed to the target, initiate one or more predetermined actions, as will be discussed in greater detail below. By doing so, broadcast disguised as normal broadcast of a communication scheme may be used to initiate multi-agent functionality.

In one or more embodiments of the invention, the initiating host (100) is not aware of each of the participating hosts (120) prior to sending the single broadcast message. For example, the initiating host (100) may not perform a discovery and/or coordination process with the participating hosts (120) prior to sending the single broadcast message, i.e., the ARP request or other network discovery broadcast message. Thus, while the initiating host (100) may be aware that there are other entities operably connected to it via the network (110), the initiating host (100) may not know whether there are any participating hosts (120) that are programmed to participate in the multi-agent process by performing specific action in response to receiving broadcasts that target other entities.

In one or more embodiments of the invention, the initiating host (100) does not have network communication information for each of the participating hosts (120) prior to sending the single broadcast message. For example, the initiating host (100) may not perform a network discovery and/or identification process for each of the participating hosts (120) prior to sending the single broadcast message.

By utilizing an ultra-low overhead method of initiating the multi-entity process, embodiments of the invention may provide a method of initiating a multi-entity process that efficiently scales to large numbers of participating hosts (120). Further, as will be discussed in greater detail below, because the participating hosts (e.g., 120A, 120N) may virtual machines, coordination between thousands of independent entities (i.e., thousands of virtual machines or other types of logical entities) may make contemporary methods of initiating a multi-entity processes inefficient and/or infeasible.

The components of the system illustrated in FIG. 1 may be operably connected to each other and/or operably connected to other entities (not shown) via any combination of wired and/or wireless networks (e.g., network 110). Each component of the system illustrated in FIG. 1 is discussed below.

The initiating host (100) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The initiating host (100) may be other types of computing devices without departing from the invention. For additional details regarding a computing device, refer to FIG. 7.

The initiating host (100) may be a logical device without departing from the invention. For example, the initiating host (100) may be a virtual machine that utilizes computing resources of any number of physical computing devices to provide the functionality of the initiating host (100). In one or more embodiments of the invention, the initiating host (100) is implemented as a virtual machine hosted by a computing device (see, e.g., FIG. 7) such as a server or a cloud computing architecture.

In one or more embodiments of the invention, the initiating host (100) manages multi-agent services performed by the participating hosts (120). To manage the multi-agent services, the initiating host (100) may coordinate the start of the multi-agent services. To coordinate the start of the multi-agent services, the initiating host (100) may send a network communication to the participating hosts (120). The network communication may signal to the participating hosts (120) to begin performing predetermined functionality. For example, the predetermined functionality may be initiation of a coordinated process among the participating hosts (120).

In one or more embodiments of the invention, the initiating host (100) sends a broadcast communication as the network communication. The broadcast communication may be compatible with a communication scheme employed by the network (110). For example, if the network (110) is a local area network (LAN) supported by ethernet connectivity (e.g., supported by a network switch) in accordance with any of the IEEE standards, the network communication may be a broadcast communication supported by the IEEE standard. The broadcast communication may be performed in accordance with other standards (other than IEEE ethernet LAN standards) without departing from the invention. For example, the broadcast communication may be compatible with ethernet virtual private networks (EVPN), internet protocol (IP), or any other type of network communication scheme that supports broadcast communications.

In one or more embodiments of the invention, the broadcast communication is a repurposed network communication supported by the network (110). In other words, the broadcast communication may be a network communication supported by the network (110) that is used by the initiating host (100) for a purpose different from that intended by the communication scheme supported by the network (100) and/or the participating hosts (120). Thus, the initiating host (100) and the participating hosts (120) may support a divergent network communication scheme from that supported by the network (110) but that is still compatible with the network (110).

In one or more embodiments of the invention, the broadcast communication is a ping that repurposes an ARP broadcast supported by the network (110). The ping may cause an ARP broadcast that is a broadcast to all of the endpoints, e.g., participating hosts (120), initiating host (100), and other devices not illustrated in FIG. 1 that are operably connected to the network (110) of the network (110). An ARP broadcast may be a broadcast communication that includes a request for an endpoint specified in the ARP broadcast to send predetermined information to the entity that initiated the ARP broadcast. When broadcast over the network (110), all endpoint devices that receive the ARP broadcast may review the contents of the ARP broadcast to determine whether the ARP broadcast includes endpoint information that implicates the receiving device. If the endpoint information does not implicate the receiving device, the receiving device may not take any action in response to receiving the ARP broadcast under the communication scheme supported by the network (110).

However, the initiating host (100) and the participating hosts (120) may be programmed to perform predetermined functionality in response to receiving a ARP broadcast that would otherwise not implicate them as receiving devices. Specifically, the initiating host (100) and the participating hosts (120) may both take action based on the endpoint information included in the ARP broadcast even though such devices would not be implicated based on the communication scheme supported by the network (110).

For example, the initiating host (100) and/or the participating hosts (120) may be programmed to initiate execution of a first program when an ARP broadcast that specifies a first endpoint is received. The initiating host (100) and/or the participating hosts (120) may be programmed to perform a different action when an ARP broadcast that specifies a second endpoint is received. The initiating host (100) and/or the participating hosts (120) may be programmed to respond differently to ARP broadcasts that specify any number of respective endpoints.

Thus, the ARP may be used as an effective application programming interface that enables the functionality of any number of devices (e.g., participating hosts (120)) to be initiated by requesting that ping commands be sent to different entities. Consequently, an ultralow overhead method of managing the functionality of any number of devices may be provided via the methods described herein.

By doing so, embodiments of the invention may provide a method for managing multi-agent processes in a manner that does not require the overhead associated with organizing entities for cooperative action using conventional communication schemes supported by a network that interconnects the participating hosts (120) and the initiating host (100). For additional details regarding the initiating host (100), refer to FIG. 2.1.

The participating hosts (120) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The participating hosts (120) may be other types of computing devices without departing from the invention. For additional details regarding computing devices, refer to FIG. 7.

The participating hosts (120) may be logical devices without departing from the invention. For example, the participating hosts (120) may be virtual machines that utilize computing resources of any number of physical computing devices to provide the functionality of the participating hosts (120).

In one or more embodiments of the invention, each of the participating hosts (120) performs predetermined functionality under the direction of the initiating host (100). For example, each of the participating hosts (120) may perform different types of predetermined functionality when a broadcast message including predetermined content is received.

In one or more embodiments of the invention, each of the participating hosts (120) includes functionality to perform network communications in accordance with a communication scheme supported by the network (110). For example, the participating hosts (120) may each send and receive communications in accordance with an IEEE standard (or other standard) for sending receiving communications via the network (110).

In one or more embodiments of the invention, the predetermined functionality performed by each of the participating hosts (120) is determined based on endpoint information included in broadcast communications of the network (110). For example, different predetermined functionality may be performed in response to different endpoint information included in broadcast communications.

In one or more embodiments of the invention, each the participating hosts (120) utilizes repurposed network communications, i.e., a network communication that would not ordinarily implicate the receiving participating host based on the communication scheme supported by the network (110) as the broadcast communications from which the predetermined functionality to be performed is determined. For example, each of the participating hosts (120) may interrogate ARP broadcasts received via the network (110) to identify endpoint information included in the ARP broadcasts. If the endpoint information matches predetermined endpoint information, corresponding functionality of the participating hosts (120) may be invoked in response to receiving the ARP broadcasts. Each of the participating hosts (120) may perform predetermined functionality based on different types of repurposed network communications without departing from the invention.

When all or a portion of the participating hosts (120) receive a broadcast communication that causes all or a sub-portion of the portion of the participating hosts (120) to take action, the participating hosts (120) may cooperatively perform system-level functionality. Each of the participating hosts of the sub-portion of the portion of the participating hosts (120) may perform the same or different functionality. By performing such functionality, cooperative, system-level functionality may be performed.

Such system-level functionality may be for any purpose. In one or more embodiments of the invention, the system-level functionality relates to diagnostic testing of a system that includes the participating hosts (120). For example, the participating hosts may be part of a cluster that will provide system-level functionality. To perform such functionality, the cluster may be tested by placing stresses on the system. As will be discussed in greater detail below, each of the participating hosts (120) may place a load on the cluster coordinated by the initiating host (100). For additional details regarding participating hosts (120), refer to FIG. 2.3.

The network (110) may be any type and/or combination of types of networks that operably connect the initiating host (100), the participating hosts (120) and/or other entities (not shown). The network (110) may be, for example, an ethernet network including a switch that forwards communications between any number of entities that utilize the network (110). The network (110) may be other types of network and may be operably connected to any number of entities and/or other networks without departing from the invention.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, an initiating host (100) may initiate multi-agent processes. FIG. 2.1 shows a diagram of an example initiating host (200) in accordance with one or more embodiments of the invention. The example initiating host (200) may be similar to the initiating host (100, FIG. 1) of FIG. 1.

As discussed above, the example initiating host (200) may provide coordination services to other entities. To do so, the example initiating host (200) may generating specially formed network communications that have been repurposed for coordination purposes rather than for the network communications design functionality. However, because the specially formed network communications are compatible with the communications scheme, transmitting the specially formed network communications are unlikely to disrupt the functionality of any network transmitting the specially formed network communications.

To provide the aforementioned functionality of the example initiating host (200), the example initiating host (200) may include virtual machines (210) and a hypervisor (215). Each component of the example initiating host (200) is discussed below.

The virtual machines (210) may be applications. For example, the virtual machines (210) may be applications executing using physical computing resources of the example initiating host (200). In other words, each of the virtual machines (210) may be implemented as computer instructions stored on a persistent storage that when executed by a processor of the example initiating host (200) may give rise to the functionality of the respective virtual machine. The example initiating host (200) may host any number of virtual machines (e.g., 210.2, 210.4) without departing from the invention.

One or more of the virtual machines (210) may host applications that give rise to the functionality of the example initiating host (200) for multi-agent process initiation purposes. Other virtual machines may perform other functions. For example, the other virtual machines may provide the same functionality as a participating host (or may provide entirely different functionality). For additional details regarding the one or more virtual machine that gives rise to the functionality of the example initiating host (200) for multi-agent process initiation purposes, refer to FIG. 2.2.

The hypervisor (215) may manage execution of the virtual machines (210). The hypervisor (215) may instantiate and/or terminate any of the virtual machines (210). The hypervisor (215) may also allocate computing resources of the example initiating host (200) to each of the virtual machines (e.g., 210.2, 210.4). For example, the hypervisor (215) may allocate processor cycles, memory capacity, memory bandwidth, storage space, storage bandwidth (e.g., IOPS), and/or network communication bandwidth among the virtual machines (210) and/or other entities hosted by the example initiating host (200).

In one or more embodiments of the invention, the hypervisor (215) is a hardware device including circuitry. The hypervisor (215) may be, for example, a digital signal processor, a field programmable gate array, or an application specific integrated circuit. The hypervisor (215) may be other types of hardware devices without departing from the invention.

In one or more embodiments of the invention, the hypervisor (215) is implemented as computing code stored on a persistent storage that when executed by a processor performs the functionality of the hypervisor (215). The processor may be a hardware processor including circuitry such as, for example, a central processing unit or a microcontroller. The processor may be other types of hardware devices for processing digital information without departing from the invention.

While the example initiating host (200) of FIG. 2.1 has been described and illustrated as including a limited number of components for the sake of brevity, an example initiating host (200) in accordance with embodiments of the invention may include additional, fewer, and/or different components than those illustrated in FIG. 2.1 without departing from the invention.

Further, while the functionality of the example initiating host (200) has been described as being performed by applications hosted by a virtual machine that is hosted by the example initiating host (200), the applications that give rise to the functionality of the example initiating host (200) may be hosted by the example initiating host (200) directly without departing from the invention.

To further clarify the functionality of the example initiating host (200), a diagram of an example virtual machine (220) in accordance with one or more embodiments of the invention is shown in FIG. 2.2. The example virtual machine (220) may provide multi-agent process initiation functionality. To provide such functionality, the example virtual machine (220) may host a communication manager (222) and applications (224). Each is discussed below.

In one or more embodiments of the invention, the communication manager (222) provides repurposed communications functionality. Repurposed communications functionality may include (i) generating and/or transmitting specially formed network communications for initiating system-level functionality and (ii) monitoring network communications for specially formed network communications. The example virtual machine (220) may take action in response to specially formed network communications based on commands associated with the specially formed network communications.

To provide the repurposed communications functionality, the example virtual machine (220) may include an address conversion table (232) stored in persistent storage (230). The address conversion table (232) may specify associations between commands and endpoint information included in the specially formed network communications. Different end point information may be associated with different commands. The associations specified by the address conversion table (232) may enable the communication manager (222) to generate the specially formed network communications and determine which commands are implicated by received specially formed communications. For additional details regarding the address conversion table, refer to FIG. 3.

The communication manager (222) may perform its repurposed communication in response to commands received from other entities, e.g., the applications (224). For example, upon receipt of a command, the communication manager (222) may obtain endpoint information associated with the command using the address conversion table (232) and generate/transmit a specially formed communication using the obtained endpoint information.

By doing so, the specially formed communications based on the address conversion table (232) may form an effective application programming interface that enables other entities to utilize the functionality of any number of participating hosts. Accordingly, the entities may simply request that a particular command be executed, the communication manager (222) may identify corresponding end point information, and utilize the functionality of a ping utility to cause and ARP packet to be broadcast having the obtained endpoint information. Participating hosts that receive such packets may automatically perform the command requested by that entities.

The applications (224) may be any types of applications. Each of the applications (224) may perform similar or different functions. One of the applications (224) may provide system-level functionality. In other words, one of the applications (224) may be adapted to provide its functionality cooperatively with other entities to give rise to system-level functionality. To coordinate with the other entities, the application may include functionality to send commands to the communication manager (222) for transmission to the other entities. By doing so, coordination between the application and other applications hosted by other virtual machines may be efficiently coordinated.

When performing functionality, the applications (224) may store application data (234) in the persistent storage (230). Such application data (234) may include information regarding the portion of the system-level functionality performed by the application.

While the example virtual machine (220) of FIG. 2.2 has been described and illustrated as including a limited number of components for the sake of brevity, an example virtual machine (220) in accordance with embodiments of the invention may include additional, fewer, and/or different components than those illustrated in FIG. 2.2 without departing from the invention.

As discussed above, participating hosts may cooperatively perform system-level functionality with other participating hosts. FIG. 2.3 shows a diagram of an example participating host (240) in accordance with one or more embodiments of the invention. The example participating host (240) may be similar to the participating hosts (120, FIG. 1) of FIG. 1. The example participating host (240) may be similar to the example initiating host (200, FIG. 2.1) in that it may host virtual machines (210) that host applications that give rise to the functionality of the example participating host (240) or, alternatively, may host the applications that give rise to the functionality of the example participating host (240) directly.

Like a virtual machine hosted by an initiating host, an example virtual machine (250) in accordance with one or more embodiments of the invention as shown in FIG. 2.4 that is hosted by an example participating host (e.g., 240, FIG. 2.3) may host a communication manager (222), applications (224), and include persistent storage (230) storing an address conversion table (232) and application data (234). In this manner, all entities participating in system-level functionality may include common components that cooperatively provide the system-level functionality. To provide such functionality, these entities may coordinate using an ultra-low overhead communications scheme that repurposes network communications while remaining communication scheme compliant. Doing so may reduce the computing resource burden, e.g., processor cycles, memory use, communication bandwidth, for coordinating between the entities. Consequently, a system in accordance with embodiments of the invention may efficiently scale to enable coordination between hundreds, thousands, or more entities that participate in system-level functionality.

Figure 3:
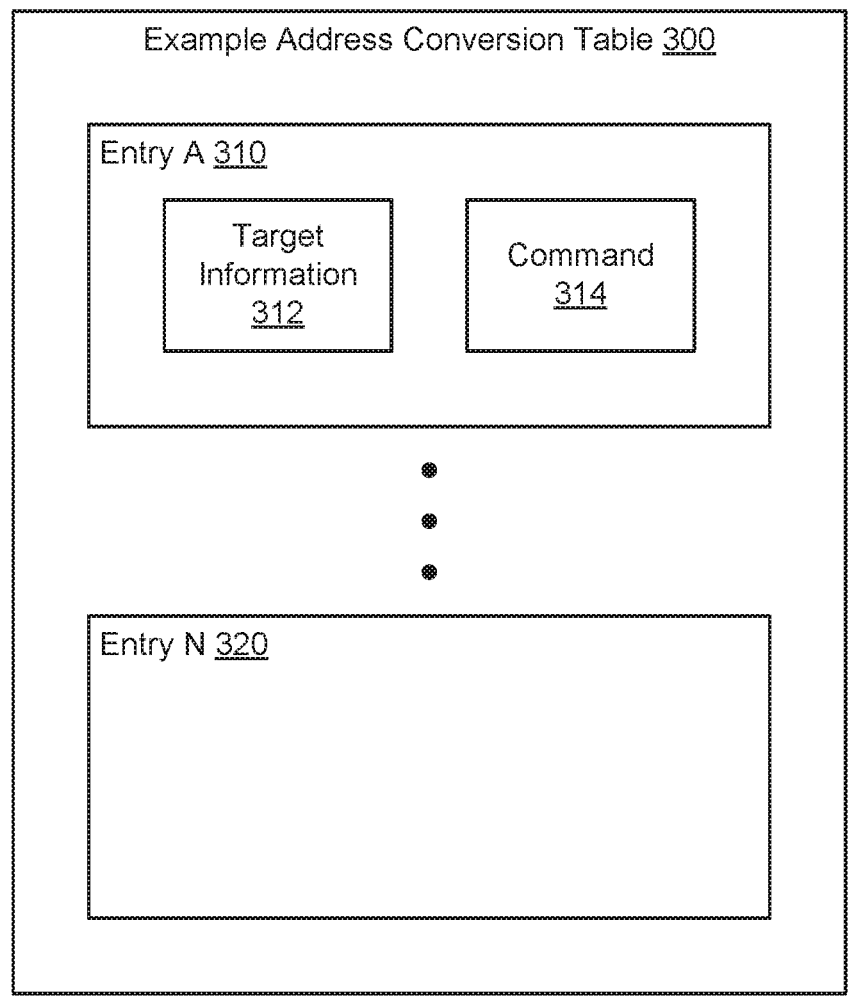
FIG. 3 shows a diagram of an example address conversion table in accordance with one or more embodiments of the invention.

As discussed above, initiating hosts and participating hosts may utilize an address conversion table. FIG. 3 shows an example address conversion table (300) in accordance with one or more embodiments of the invention. The example address conversion table (300) may include information used to interpret network communications. Specifically, the example address conversion table may include relations between repurposed network communications such as, for example, ARP broadcasts, and commands that may be executed in response to receiving such a repurposed network communication.

The example address conversion table (300) may include any number of entries (e.g., 310, 320). Each of the entries of the example address conversion table (300) may specify a relationship between a command (e.g., 314) and target information (e.g., 312). The target information (312) may specify characteristics of a repurposed network communication that, when received, indicates that the corresponding command (314) should be performed by the entity that received the repurposed network communication.

For example, consider a scenario in which an entity receives an ARP broadcast. The received ARP broadcast may include identification information (e.g., IP address) associated with a particular entity. When the entity receives the ARP broadcast, the entity may compare the identification information to target information included in each of the entries of the example address conversion table (300). If the identification information matches the target information of an entry, the entity may determine that the command corresponding to the entry is to be performed by the receiving entity.

In one or more embodiments of the invention, the target information (e.g., 312) in the entries of the example address conversion table (300) corresponds to different identification information included in network communications that are broadcast to all entities included in a particular network segment. For example, the network communications may be ARP broadcasts that each include different target information. In this manner, a network communication broadcast to multiple entities on the network segment may each be instructed to perform a particular command at the same time. In other words, individual commands each of the entities in the network command without requiring that requests for performing the command be sent to each entity on the network segment separately. Rather, a repurposed network communication compatible with a communication scheme employed for the network segment may be utilized to coordinate the functionality of multiple entities interconnected by a network segment.

Further, similarly repurposed network communications may be used to discover other entities that will cooperatively performed system-level functionality. For example, an entity on a network segment may broadcast an ARP broadcast that includes identification information which, via the example address conversion table (300) indicates that the transmitting entity is one that will participate in system-level functionality. Entities receiving such an ARP broadcast may utilize identification information (included in the ping) of the entity that initiated the ARP broadcast to identify that the transmitting entity will participate in the system-level functionality. By doing so, all entities disposed on a particular network segment may identify other entities that will participate in system-level functionality without resorting to more complicated and/or other high overhead discovery protocols.

For example, consider a scenario where an entity joins a network segment. When joining the network segment, the entity may initiate an ARP broadcast that includes its own identification information and identification information of a target device that does not exist on the network segment. However, the identification information of the target device may correspond to a command (e.g., 314) that causes receiving devices to record the identification information of the now-joined entity as one that will participate in system-level functionality. In this manner, transmission of a single broadcast network communication may enable all other entities on the network segment to discover the newly joined entity. Over time, such broadcast network communications enable all entities on a network segment to identify all other entities that will cooperatively perform system-level functionality in a manner that consumes fewer computing resources when compared to other methods of discovering other entities that will participate in system-level functionality.

While the example address conversion table (300) has been described with respect to examples of particular commands (e.g. 314) and particular target information (312), an example address conversion table (300) may utilize other types of target information and may utilize different commands without departing from the invention. Additionally, while the example address conversion table (300) has been described as a list of entries, the example address conversion table (300) may be organized in a different manner, may include additional, less, and/or different information, may be divided into any number of separate data structures, and/or may be incorporated into larger data structures that include different information without departing from the invention.

Returning to FIG. 1, the system may facilitate execution of system-level functionality cooperatively provided by any number of participating hosts (120). FIGS. 4.1-5 illustrate methods may be performed by components of the system of FIG. 1 to provide such functionality. While the methods illustrated in FIGS. 4.1-5 are illustrated as a series of steps, the steps may be performed in a different order, some of the steps may be omitted, and/or any number of the steps may be performed in a parallel and/or partially overlapping manner.

FIG. 4.1 shows a flowchart of a method in accordance with one or more embodiments of the invention. The method depicted in FIG. 4.1 may be used to perform system-level functionality in accordance with one or more embodiments of the invention. The method shown in FIG. 4.1 may be performed by, for example, an initiating host (e.g., 100, FIG. 1). Other components of the system illustrated in FIG. 1 may perform all, or a portion, of the method of FIG. 4.1 without departing from the invention.

In step 400, a multi-agent initiation request is obtained from an application.

In one or more embodiments of the invention, the multi-agent initiation request specifies that all, or portion, of the entities that will participate in a particular system-level functionality initiate their portion of the particular system-level functionality. The request may specify that each entity is to initiate the functionality at a particular point in time or as soon as possible.

The request may specify other parameters such as, for example, a duration of performance, a trigger for when the performance is to terminate, characteristics of the performance (e.g., quantity of computing resources to commit for performance, how to perform the performance, etc.), etc.

In one or more embodiments of the invention, the request specifies execution of a particular application by each of the entities that will participate in the particular system-level functionality. For example, the request may specify execution of a stress test application. The stress test application may cause each entity that executes the stress test application to place a system-level load on each participating entity and the infrastructure interconnecting each of the participating entities. Executing such a stress test application may cause each executing entity to send network traffic, utilize system resources, and/or otherwise consume resources of a distributed computing system.

In one or more embodiments of the invention, the multi-agent initiation request is received from a stress test application that is preparing to stress test a distributed computing system. The distributed computing system may host the participating hosts and/or the initiating host (as well as other entities).

In step 402, a network communication is generated based on the multi-agent initiation request.

In one or more embodiments of the invention, the network communication is generated based on the command specified by multi-agent initiation request. For example, a ARP broadcast may be generated that includes information indicating that all entities receiving the ARP broadcast should perform the command.

In one or more embodiments of the invention, the network communication is generated by repurposing a network communication. In other words, a ARP broadcast may be repurposed to provide coordination services for performance of the command across multiple entities operably connected by a network segment (e.g., all entities operably connected by a LAN).

In one or more embodiments of the invention, the network communication is generated via the method illustrated in FIG. 4.2. Network communication may be generated via other methods without departing from the invention.

In step 404, network communication is transmitted to at least two hosts.

In one or more embodiments of the invention, the network communication is transmitted as a broadcast across one or more network segments. By receiving the broadcast, the at least two hosts may receive the network communication.

In one or more embodiments of the invention, the network communication is transmitted by sending a request to a ping utility to a target. The target may be determined using the example address conversion table (300, FIG. 3). For example, the multi-agent initiation request may specify the command and the command may be used to look up appropriate target information (e.g., an and point).

Once the ping utility obtains the ping request for the target, the ping utility (or other network discovery utility) may generate an ICMP packet based on the target information to obtain an ARP request. The ARP request may then be broadcast in accordance with a network scheme employed by the network over which the ARP request is broadcast.

The method may end following step 404.

As noted with respect to step 402, a network communication may be generated via the method illustrated in FIG. 4.2. FIG. 4.2 shows a flowchart of a method in accordance with one or more embodiments of the invention. The method shown in FIG. 4.2 may be performed by, for example, an initiating host (e.g., 100, FIG. 1). Other components of the system illustrated in FIG. 1 may perform all, or a portion, of the method of FIG. 4.2 without departing from the invention.

In step 410, at least one command is identified based on the multi-agent initiation request.

In one or more embodiments of the invention, the multi-agent initiation request specifies the command. The command may be, for example, initiation of a particular system-level functionality. For example, the command may be to initiate a stress test. The stress test may cause a system-level load to be placed on the system. The system-level load may be generated by any number of participating hosts that are part of the system for which the system-level load is to be placed.

In step 412, target information to be included in the at least one command is identified using an address conversion table and the at least one command.

The target information may be identified by using the at least one command as a key. The at least one command to be used to identify one or more entries of the address conversion table. The target information may be obtained from the identified one or more entries. For example, as described with respect to FIG. 3, each entry of an address conversion table may be associated with a particular command in each entry may associate the corresponding command with target information.

In one or more embodiments of the invention, the target information is identification information for a particular network end point. For example, the target information may be an Internet protocol address. The Internet protocol address may be associated with an endpoint that does not exist within a particular network segment over which the network communication that includes the target information will be broadcast. For example, the network communication may be an ARP broadcast that specifies a network endpoint that does not exist within the network segment over which network communication will be broadcast. By doing so, transmission of such a broadcast will not otherwise impact entities disposed on the network segment. In other words, transmission of the ARP broadcast may not cause predetermined functionality associated with the communication scheme supported by the network segment to be invoked by transmission of the ping. The ARP broadcast may be obtained, as noted above, by utilizing a ping utility or other network discovery utility.

Any quantity of target information may be identified in step 412. For example, target information corresponding to multiple commands may be identified in step 412. Alternatively, there may be a one to many relationship between commands and target information. For example, command may correspond to multiple pieces of target information in the address conversion table. Thus, identification of one command may correspond to identification of multiple pieces of target information in the address conversion table.

In step 414, the network communication is generated by forming disguised, communication protocol compliant broadcasts based on the at least one target information.

In one or more embodiments of the invention, the network communication is generated by forming an ARP broadcast for the at least one target information. As noted above, multiple pieces of target information may be identified in step 412. Consequently, the network communication may correspond to multiple ARP broadcast which each correspond to one of the pieces of target information.

In one or more embodiments of the invention, each of the ARP broadcasts is generated based on a communication scheme supported by a network segment over which the ARP broadcasts will be transmitted. Each of the ARP broadcasts may be formed such that the target information corresponding to Internet protocol addresses of network endpoints specified by the address conversion table for the command identified in step 410 is included in the ARP broadcasts.

For example, consider a scenario in which the command is the initiation of a stress test. Using the address conversion table, an internet protocol address may be identified. The identified IP address may be used as a basis for generation of a ping which, when broadcast over a network segment, is designed to cause an entity corresponding to the IP address to respond to the ping (i.e., to comply with the communication scheme supported by the network segment). However, because the IP address is not actually associated with any network endpoint of the network segment, all entities receiving such a ping would not take any action in response to the ping. However, a portion of the entities disposed on the network segment may be programmed to respond to reception of the ARP broadcasts via the method illustrated in FIG. 5, which is discussed in detail below. By doing so, the network communication (i.e., the ARP broadcasts) may be repurposed to coordinate system-level functionality in a manner that consumes fewer computing resources (e.g., network bandwidth, processing cycle, etc.) than other methods of coordinating system-level functionality.

The method may end following step 414.

Figure 5:
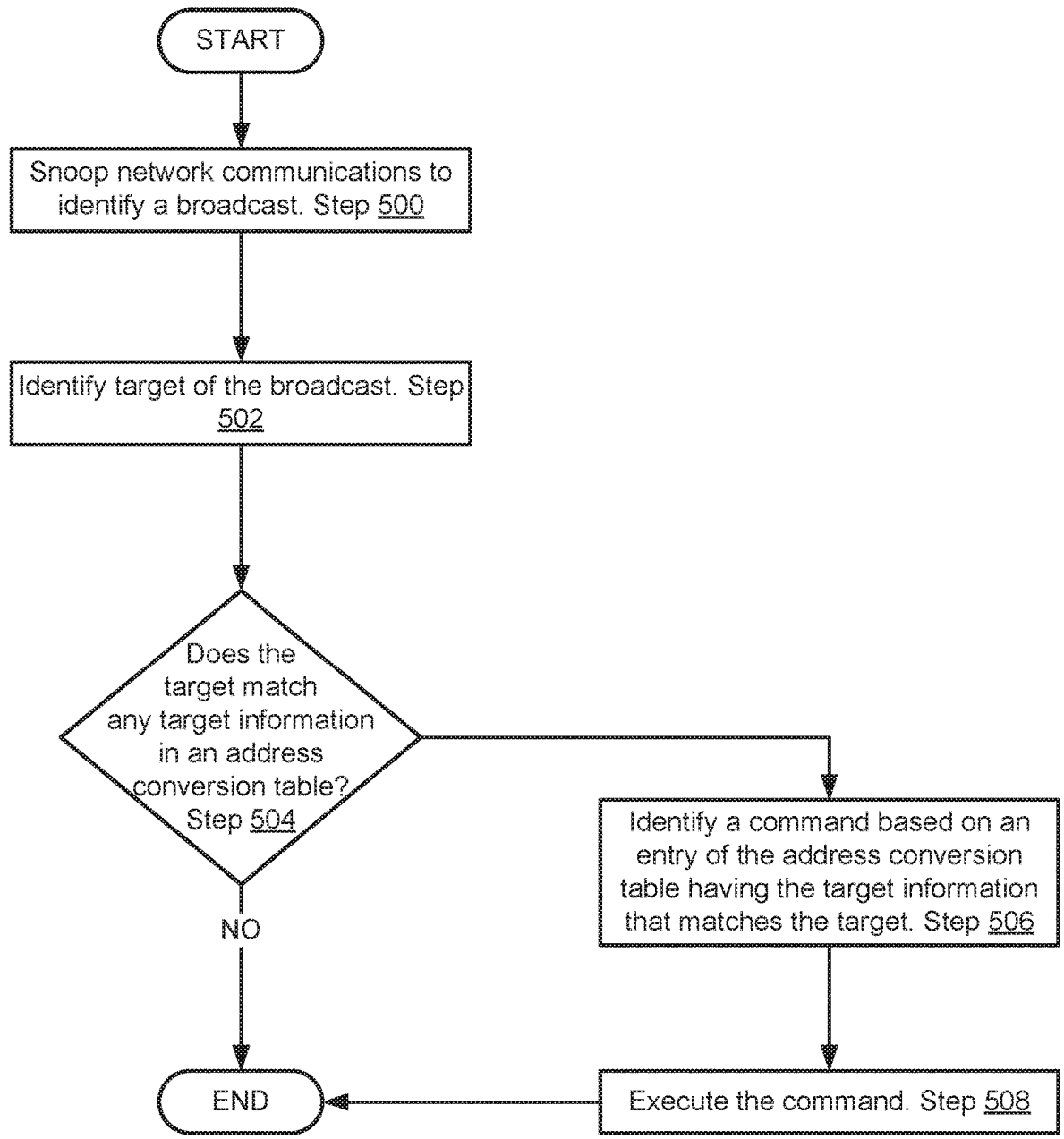
FIG. 5 shows a flowchart of a method of executing system-level functionality in accordance with one or more embodiments of the invention.

As noted with respect to step 414, a repurposed network communication may cause participating entities to respond via the method illustrated in FIG. 5. FIG. 5 shows a flowchart of a method in accordance with one or more embodiments of the invention. The method shown in FIG. 5 may be performed by, for example, a participating host (e.g., 120, FIG. 1). Other components of the system illustrated in FIG. 1 may perform all, or a portion, of the method of FIG. 5 without departing from the invention.

In step 500, network communications are snooped to identify a broadcast.

In one or more embodiments of the invention, network communications are snooped by interrogating the network communications received by an entity even when the network communication would not ordinarily implicate action by the entity. For example, a communication manager hosted by the participating node may interrogate all network communications received by the participating host. The communication manager interrogate all network communications by appropriately registering with the operating system or other entity of the participating host tasked with managing the reception and/or distribution of communications received by the participating host. After registration, the communication manager may be provided with copies of all such network communications.

In step 502, the target of the broadcast is identified.

In one or more embodiments of the invention, the broadcast is an ARP broadcast. The ARP broadcast may specify a target of the broadcast, e.g., a network end point. The target may be specified by inclusion of an internet protocol address in the ARP broadcast. The broadcast may be other types of network communications that are compliant with other types of communication schemes without departing from the invention.

In one or more embodiments of the invention, the target of the broadcast is identified using information included in the broadcast. For example, the broadcast may include identification information (e.g., target information) that allows entities receiving the broadcast to determine whether the receiving entity is implicated by the broadcast.

In step 504, it is determined whether the target of the broadcast matches any target information in the address conversion table. For example, an entry in the address conversion table may be keyed to the target. If such an entry exists, it is determined that the target matches target information included in the address conversion table.

If the target matches any target information, the method may proceed to step 506. If the target does not match any target information, the method may end following step 504. In other words, the participating host may determine that the broadcast does not implicate initiation of functionality of the participating host that gives rise to system-level functionality.

In step 506, a command is identified based on an entry of the address conversion table having the target information that matches the target.

In one or more embodiments of the invention, the command is identified by matching the target to target information included in an entry of the address conversion table. The entry may include or otherwise indicate the command to be executed. For example, the entry may include an identifier of the command.

In step 508, the command identified in step 506 is executed.

For example, if the command indicates that a program is to be executed, the program may be executed in step 508. By doing so, system-level functionality may be initiated. For example, if multiple participating hosts receive the broadcast, each of the multiple participating hosts may initiate execution of separate instances of an application implicated by the broadcast. Doing so may coordinate execution of the separate instances which cause each of the multiple hosts to perform predetermine functionality concurrently giving rise to system-level functionality.

The method may end following step 508.

To further clarify aspects of embodiments of the invention, a non-limiting example is illustrated in FIGS. 6.1-6.3. Each of these figures may illustrate a system similar to that illustrated in FIG. 1, information utilized by the system, and/or actions performed by the system. For the sake of brevity, only a limited number of components of the system of FIG. 1 are illustrated in FIGS. 6.1-6.3.

Example

Consider a scenario as illustrated in FIG. 6.1 in which a system provides predetermine functionality. To provide such functionality, the system may include an initiating host (604) that coordinates functionality performed by a first participating host (600.2), a second participating host (600.4), and a third participating host (600.6). As part of the system functionality, each of the participating hosts and the initiating host may utilize storage provided by a network attached storage (606). Each of these network components may be operably connected via a switch (602).

At the point in time illustrated in FIG. 6.1, the third participating host (600.6) has been newly added to the system. Because of the new addition, the initiating host (604) may not be aware that the third participating host (600.6) will participate in providing system-level functionality of the system shown in FIG. 6.1.

To provide system-level functionality, each of the participating hosts and the initiating host include an address conversion table as shown in FIG. 6.2. The address conversion table includes four entries as shown in rows 2-5 (labeled as entry 1, 2, 3, and 4, respectively). The first entry specifies that the command hello is associated with target information 254.254.1.201. The second entry specifies the command shut down is associated with target information 254.254.1.202. Similarly, the third entry specifies that the command report is associated with target information 254.254.1.203. Lastly, the fourth entry specifies that the command initiate stress test is associated with target information 254.254.1.204.

As previously noted, the third participating host (600.6) has newly joined the system of FIG. 6.1. After joining, a series of interactions between components of the system take place as shown in the interaction diagram shown in FIG. 6.3. In FIG. 6.3, time increases moving downward from the top to bottom of the page.

After the join (650), the third participating host (600.6) determines that a hello command needs to be executed so that other entities of the system of FIG. 6.1 are aware of its presence. To do so, the third participating host (600.6) generates a first ARP broadcast (652). To generate the first ARP broadcast (652), the third participating host (600.6) obtains the target information included in the first row of the address conversion table shown in FIG. 6.2. The ARP broadcast is then generated using the target information, i.e., 254.254.1.201. To do so, the third participating host (600.6) instructs its ping utility to ping 254.254.1.201. By doing so, the first ARP broadcast is generated.

This target information was intentionally selected because no end point connected via the switch shown in FIG. 6.1 utilizes this address. Consequently, an ARP broadcast targeting this address does not implicate action by any entity of the system of FIG. 6.1.

After generating the first ARP broadcast, a first ARP broadcast (654) is transmitted to the initiating host (604), the first participating host (600.2), and the second participating host (600.4). For brevity, the actions taken in response to reception of the first ARP broadcast (654) is not illustrated. However, by broadcasting the first ARP broadcast (654), each of these entities is made aware of the third participating host (600.6) and that the third participating host (600.6) will participate in system-level functionality due to the endpoint information, i.e., 254.254.1.201 included in the broadcast.

At a later point in time the initiating host (604) determines that an initiation of stress test (656) functionality of the system should be undertaken. To do so, the initiating host (604) generates a second ARP Broadcast (658). To generate the second ARP Broadcast (658), the initiating host (604) consults the fourth entry of the address table of FIG. 6.2 to obtain the target information 254.254.1.204 which corresponds to the command initiate stress test.

After generation of the second ARP broadcast via the ping utility, the initiating host (604) transmits the second ARP broadcast (660) to each of the participating nodes. In response, each of the participating hosts and the initiating host execute the stress test (662). For example, each of the participating hosts may receive the second ARP broadcast (660), identify that the target information included in the second ARP broadcast (660) corresponds to an initiate stress test command, and executes a stress test application in response to the identification. By doing so, each of the participating hosts and initiating host begin concurrent execution of the stress test application resulting in a heavy load being placed on the system.

When placed in such a state, each of the participating hosts and the initiating host may attempt to access the network attached storage, monitoring each of their abilities to access this resource, and aggregate such information to accurately determine whether the system is able to cope with a heavy load placed on the system.

End of Example

Figure 7:
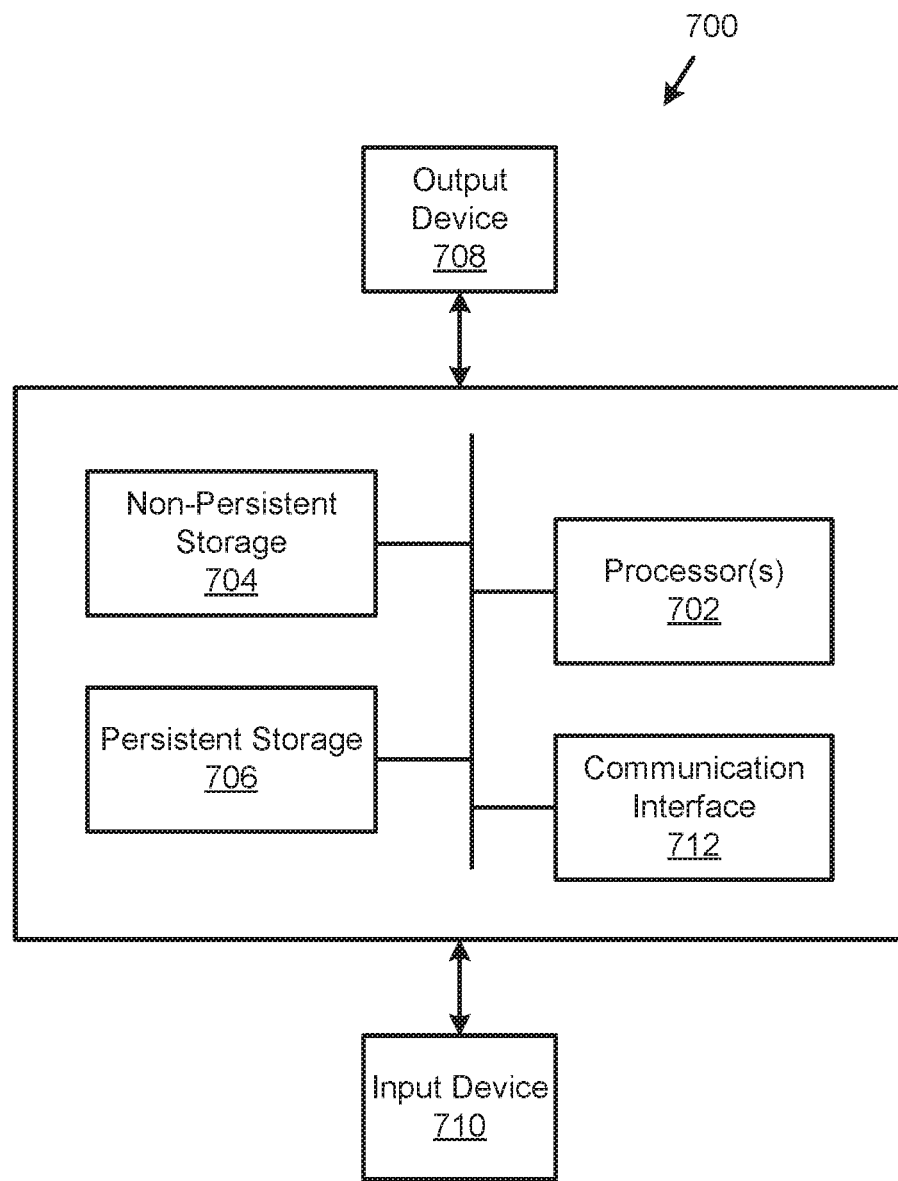
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide an improved method for coordinating functionality of multiple devices of a distributed system. For example, embodiments of the invention may repurpose broadcast network communications for coordination purposes. By doing so, embodiments of the invention may reduce computing resources utilize for coordination between components of a distributed system when providing system-level functionality.

In one or more embodiments of the invention, the repurposed network communications may be compliant with a communications scheme utilized by a network operably connecting components of the distributed system. Specifically, the repurposed network communications may be designed to avoid invoking functionality of the communications scheme while allowing for coordination between components of the distributed system. By doing so, coordination between components of the distributed system may be facilitated while minimizing the computational cost of utilizing the repurposed network communications.

Repurposing of the network communications may also generate an effective application programming interface that enables simple use of complex, multi-agent functionality. For example, the repurposed network communications may be ARP broadcasts invoked using a ping utility. The target of the ARP broadcasts may not exist on a network. However, other entities on the network may be programmed to take predetermined action, other than responding to the ARP broadcasts in accordance with a network communication scheme.

Thus, embodiments of the invention may address problems that arise due to the technological environment of distributed systems that utilize a standardized communications scheme that would otherwise needlessly consume computing resources for coordination purposes. The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A host, comprising:
    persistent storage storing an address conversion table that associates targets of repurposed communications with commands to be performed by entities that receive the repurposed communications, wherein the targets of the repurposed communications are network endpoints that do not exist within a network segment of which the host is a member;
    a processor programmed to execute a communication manager programmed to:
        obtain a multi-agent initiation request from an application;
        generate a network communication based on the multi-agent initiation request using the address conversion table, wherein the network communication comprises one of the repurposed communications that specifies a target of the targets, wherein the target is based on a type of command specified by the multi-agent initiation request; and
        transmit the network communication to at least two other hosts on the network segment to initiate the type of the command by at least one of the at least two other hosts.

2. The host of claim 1, wherein the network communication is transmitted to the at least two other hosts via a broadcast.

3. The host of claim 2, wherein the network communication is an address resolution protocol broadcast.

4. The host of claim 1, wherein the address conversion table associates:
    a first command with a first target; and
    a second command with a second target.

5. The host of claim 4, wherein the multi-agent initiation request specifies the first command.

6. The host of claim 5, wherein the network communication is an address resolution protocol broadcast that is addressed to the first target.

7. The host of claim 1, wherein the one of the repurposed communications is adapted to cause the at least one of the at least two other hosts to perform a functionality different from second functionality that would be performed by the at least one of the at least two other hosts specified by a communication scheme implemented by the host and the at least one of the at least two other hosts.

8. A method for initiating a command across multiple hosts using an address conversion table that associates targets of repurposed communications with commands to be performed by entities that receive the repurposed communications, wherein the targets of the repurposed communications are network endpoints that do not exist within a network segment of which the host is a member, comprising:
    obtaining, by a host of the multiple hosts on the network segment, a multi-agent initiation request from an application;
    generating, by the host of the multiple hosts, a network communication based on the multi-agent initiation request using the address conversion table, wherein the network communication comprises one of the repurposed communications that specifies a target of the targets, wherein the target is based on a type of command specified by the multi-agent initiation request; and
    transmitting the network communication to at least two other hosts of the multiple hosts to initiate the type of the command by at least one of the at least two other hosts.

9. The method of claim 8, wherein the network communication is transmitted to the at least two other hosts via a broadcast.

10. The method of claim 9, wherein the network communication is an address resolution protocol broadcast.

11. The method of claim 8, wherein the address conversion table associates:
    a first command with a first target; and
    a second command with a second target.

12. The method of claim 11, wherein the multi-agent initiation request specifies the first command.

13. The method of claim 12, wherein the network communication is an address resolution protocol broadcast that is addressed to the first target.

14. The method of claim 8, wherein the one of the repurposed communications is adapted to cause the at least one of the at least two other hosts to perform a functionality different from second functionality that would be performed by the at least one of the at least two other hosts specified by a communication scheme implemented by the host and the at least one of the at least two other hosts.

15. A non-transitory computer readable medium comprising computer readable program code, which when executed by a computer processor enables the computer processor to perform a method for initiating a command across multiple hosts using an address conversion table that associates targets of repurposed communications with commands to be performed by entities that receive the repurposed communications, wherein the targets of the repurposed communications are network endpoints that do not exist within a network segment of which the host is a member, the method comprising:
    obtaining, by a host of the multiple hosts on the network segment, a multi-agent initiation request from an application;
    generating, by the host of the multiple hosts, a network communication based on the multi-agent initiation request using the address conversion table, wherein the network communication comprises one of the repurposed communications that specifies a target of the targets, wherein the target is based on a type of command specified by the multi-agent initiation request; and
    transmitting the network communication to at least two other hosts of the multiple hosts to initiate the type of the command by at least one of the at least two other hosts.

16. The non-transitory computer readable medium of claim 15, wherein the network communication is transmitted to the at least two other hosts via a broadcast.

17. The non-transitory computer readable medium of claim 16, wherein the network communication is an address resolution protocol broadcast.

18. The non-transitory computer readable medium of claim 15, wherein the address conversion table associates:
   a first command with a first target; and
   a second command with a second target.

19. The non-transitory computer readable medium of claim 18, wherein the multi-agent initiation request specifies the first command.

20. The non-transitory computer readable medium of claim 15, wherein the one of the repurposed communications is adapted to cause the at least one of the at least two other hosts to perform a functionality different from second functionality that would be performed by the at least one of the at least two other hosts specified by a communication scheme implemented by the host and the at least one of the at least two other hosts.

* * * * *